United States Patent [19]

Yocom et al.

[11] Patent Number: 4,725,344

[45] Date of Patent: Feb. 16, 1988

[54] METHOD OF MAKING ELECTROLUMINESCENT PHOSPHOR FILMS

[75] Inventors: Perry N. Yocom, Princeton; James Kane, Lawrenceville, both of N.J.; William E. Harty, Middletown Township, Bucks County, Pa.

[73] Assignee: RCA Corporation, Princeton, N.J.

[21] Appl. No.: 876,986

[22] Filed: Jun. 20, 1986

[51] Int. Cl.$^4$ .............................................. C09K 11/08
[52] U.S. Cl. ..................... 204/192.15; 252/301.4 S; 427/64; 427/66; 427/376.1
[58] Field of Search ............... 252/301.45; 204/192.15; 427/64, 66, 376.1, 419.1, 427

[56] References Cited

U.S. PATENT DOCUMENTS

| | | | |
|---|---|---|---|
| 2,421,207 | 5/1947 | Leverenz | 252/301.6 |
| 2,544,507 | 3/1951 | Lyon | 252/301.4 |
| 3,894,164 | 7/1975 | Dismukes et al. | 427/70 |
| 3,898,174 | 8/1975 | Lehmann | 252/301.4 S |
| 3,984,584 | 10/1976 | Lipp | 427/70 |
| 4,348,299 | 9/1982 | Okamoto et al. | 252/301.4 S |
| 4,374,037 | 2/1983 | Takahashi | 252/201.4 S |
| 4,389,973 | 6/1983 | Suntola et al. | 118/725 |
| 4,416,933 | 11/1983 | Antson et al. | 428/216 |
| 4,442,377 | 4/1984 | Higton et al. | 313/503 |
| 4,594,528 | 6/1986 | Kawakyu et al. | 313/503 |

FOREIGN PATENT DOCUMENTS

0003148  7/1979  European Pat. Off. .
1449602  9/1976  United Kingdom .

OTHER PUBLICATIONS

Viguie et al., J. Electrochem. Soc. 122, 4,585 (1975).
Barrow et al., Display International Symposium Digest 1984, pp. 249 & 250.
Shanker et al., Appl. Physics Lett. 45(9), pp. 960 & 961, 1984.
Kane et al., 1985 Internatinal Display Research Conference, Oct. 15–17, 1985, pp. 163–166.

Primary Examiner—John F. Niebling
Assistant Examiner—William T. Leader
Attorney, Agent, or Firm—Eugene M. Whitacre; Dennis H. Irlbeck; Vincent J. Coughlin, Jr.

[57] ABSTRACT

An electroluminescent film of an activated alkaline earth metal sulfide phosphor is produced by a method utilizing low temperatures for substrate protection and achieving excellent crystallinity and enhanced brightness. A layer of an alkaline earth metal halide and a suitable activatior is deposited on the substrate, heated to melt the halide and treated with gaseous hydrogen sulfide to form the phosphor. A precursor for the halide may be deposited on the substrate heated to melting temperature and treated with gaseous hydrogen halide to form the halide in-situ.

20 Claims, 4 Drawing Figures

METHOD OF MAKING ELECTROLUMINESCENT PHOSPHOR FILMS

This invention relates to a method of making electroluminescent phosphor films. More particularly, this invention pertains to a method of making luminescent films of activated alkaline earth metal sulfide phosphors having excellent crystallinity yet utilizing comparatively low fabrication temperatures.

BACKGROUND OF THE INVENTION

Luminescent films are utilized in the viewing screens of various electronic devices such as cathode-ray tubes, image tubes and electroluminescent (EL) devices. Such films are conventionally made by evaporation, i.e. electron beam evaporation, sputtering or chemical vapor deposition of luminescent materials onto a suitable substrate.

Activated alkaline earth metal sulfides, particularly activated calcium and strontium sulfides, are highly efficient luminescent materials. These materials are conventionally prepared by firing at about 1000° C. which produces a crystalline powder having a particle size of about 5 to 10 micrometers. Such highly efficient crystalline phosphor powders can be utilized in a so-called thick film electroluminescent device.

In the preparation of a thick film electroluminescent device, the crystalline powder phosphor is deposited by settling onto a suitable substrate at room temperature, usually with an adhesion promoting agent, to produce a layer 20 micrometers thick which is loosely adherent and which has considerable voids between the individual particles. The crystallinity of the phosphor is determined by the firing step prior to deposition of the thick film.

In contrast, the phosphor layer in thin film devices is smooth, adherent and approaches the theoretical density of the phosphor material. This infers that the phosphor layer is deposited atom by atom and that it has no memory of its previous form and crystallinity. The crystallinity and stoichiometry, therefore, are totally dependent on the deposition process. In thin film EL devices, the phosphor layers are conventionally formed on the substrate after a plurality of layers of other material, e.g. an electrode and a layer of dielectric material, have been deposited on the substrate. The requisite high temperature firing step precludes the use of inexpensive glass substrates due to their low softening temperatures. The softening point of the useful borosilicate glasses is between about 575° and 600° C., with temperatures up to 650° C. being possible only with special glass formulations.

Heretofore, the only practical low temperature method of forming thin film devices utilizing such crystalline phosphor powders was to sinter the powder at high temperatures to form a crystalline mass which may then be deposited onto the substrate by electron beam evaporation or sputtering. This approach, however, has two serious drawbacks. First, the alkaline earth metal sulfide phosphors are refractory materials and, therefore, are difficult to effectively evaporate. Second, the deposition of these materials by either electron beam evaporation or sputtering has a tendency to cause a loss of sulfur. While this can be compensated for by codeposition of sulfur, it is extemely difficult to maintain stoichiometry in the deposited film.

In U.S. Pat. Nos. 3,894,164 to J. P. Dismukes et al. and 3,984,587 to S. A. Lipp, there are disclosed chemical vapor deposition (CVD) methods for forming oxide and oxysulfide luminescent films by thermal decomposition of organo-metallic compounds. Such methods are not readily applicable to alkaline earth metal sulfides because very few compounds of calcium, strontium or barium have the necessary volatility for CVD. The same is true for the organic compounds of alkaline earth metals, with the exception of a few chelates.

In copending U.S. patent application, Ser. No. 853,373 entitled "CVD OF LUMINESCENT FILMS AND DEVICES COMPRISING THESE FILMS" filed Apr. 15, 1986 of Kane et al., there is disclosed a method of forming alkaline earth metal sulfide luminescent films by CVD at low temperatures wherein an alkaline earth metal chelate and an activator cation chelate are introduced into a CVD chamber as an aerosol in a nonreactive carrier gas which is admixed with hydrogen sulfide. This method will produce uniform, dense luminescent films as opposed to powders. The crystalline structure of these films, however, is relatively poor. It is therefore desirable to provide a method of producing at low temperature uniform, dense luminescent films of alkaline earth metal sulfide phosphors which have good crystal structure and adherence. Such a method is provided in accordance with this invention.

SUMMARY OF THE INVENTION

A layer of an alkaline earth metal halide, or a precursor therefor, and one or more activators for luminescent films is deposited onto a substrate. The layer is heated to a temperature sufficient to melt the halide. The molten halide is contacted with hydrogen sulfide to form the corresponding sulfide. Upon cooling, there is formed an uniform, dense layer of activated alkaline earth metal sulfide phosphor which has excellent crystallinity and adherence.

DETAILED DESCRIPTION OF THE INVENTION

Figure 1:
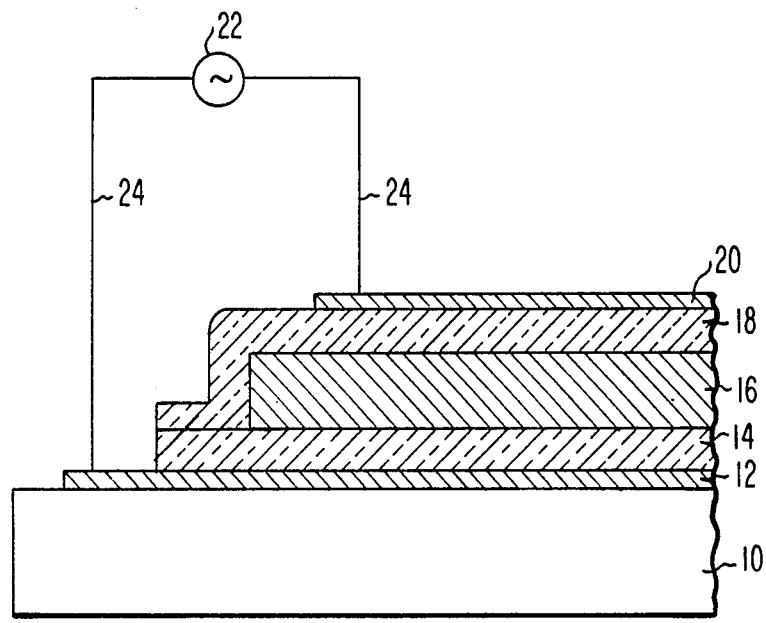
FIG. 1 is a partially schematic, partially sectional view of an electroluminescent (EL) device prepared using the method of this invention.

In accordance with this invention, an alkaline earth metal halide or a precursor therefor and a suitable activator therefor are deposited onto a suitable substrate at low temperature. The halide, or precursor, and the activator may be deposited by electron beam evaporation, sputtering, or as an aerosol according to the general method described by J. C. Viguie et al. in J. Electrochem. Soc., Vol. 122, No. 4, p. 585 (1975).

For deposition by e-beam evaporation or sputtering, the alkaline earth metal halide or precursor is finely divided and blended with a suitable quantity of one or more activators for the desired phosphors. The activators are selected from the group consisting of europium, cerium, manganese, terbium, praseodymium, antimony, samarium, thulium, tin, copper, lead, silver, gold and arsenic. While certain activators such as manganese and europium may be utilized alone, the others are conventionally utilized with a co-activator, typically sodium, potassium, lithium, rubidium, phosphorus, bromine, fluorine, chlorine or iodine. The activators, which may be utilized as the metal or a suitable salt thereof, are typically present in a total concentration of from about 0.001 to about 1.0 mole percent of the alkaline earth metal sulfide phosphor. Suitable salts of the activator metals include the halides, the carbonates, the hydroxides and the like. Combinations of activators or activator and co-activator are referred to herein in the singular.

Alternatively, particles of the alkaline earth metal halide, or precursor, and activator therefor are dissolved or dispersed into one or more solvents which are then generated into an aerosol, for example, by an ultrasonic transducer. The aerosol is transported to the substrate surface as a fine mist in a nonreactive carrier gas such as nitrogen, argon and the like. To prevent premature deposition of the transported material on the surfaces of the transfer tubing, the carrier gas is presaturated with the solvent. The solvent is suitably an organic solvent such as methanol, acetone and the like. For incorporation into an aerosol, the activator may also be introduced as a volatile or gaseous organo-metallic material, such as a cyclopentadienyl manganese tricarbonyl or a chelate such as the beta-diketonates disclosed in Dismukes et al. U.S. Pat. No. 3,894,164.

The alkaline earth metal cation of the subject phosphors may be any of the alkaline earth metals, with strontium and calcium being preferred. The halide anion may be one or more of iodide, chloride, and bromide. A preferred mixture of alkaline earth metal halides is the chloride and bromide. A particularly suitable alkaline earth metal halide is strontium halide, especially the iodide.

As utilized in the context of this invention, the term "precursor" is defined as an alkaline earth metal compound which can be deposited onto a substrate by a conventional deposition method, such as those described herein, and which will readily react with a gaseous hydrogen halide to form the corresponding alkaline earth metal halide in-situ. The precursor may be organic or inorganic in nature, with the inorganic compounds, such as alkaline earth metal carbonates or oxides, being particularly suitable.

The initial coating of the substrate with the alkaline earth halide/activator mixture is carried out at low temperature, i.e. a temperature under about 100° C. The resulting layer, which typically is from about 0.5 to 1.0 micrometer thick, is then heated to the melting temperature of the alkaline earth halide, typically from about 525°–575° C. When the layer contains a precursor, it is contacted with a gaseous hydrogen halide, preferably HI, suitably in admixture with an inert carrier gas such as nitrogen or argon, for a time sufficient to convert all of the precursor to the alkaline earth metal halide. Generally, this requires less than a minute, typically only about 30 seconds. In general, the precursors contemplated herein have higher melting points than the corresponding halides and will remain as a solid on the substrate at the temperatures utilized. Treatment with the hydrogen halide, however, will produce the alkaline earth metal halide in molten form.

The molten halide layer is contacted with gaseous hydrogen sulfide for a time sufficient to convert the alkaline earth metal halide to the corresponding sulfide. The time of contact is again dependent on the thickness of the layer. Typically, from about 15 to 30 minutes of treatment is sufficient for a halide layer about one micrometer thick before melting. The molten layer reacts with hydrogen sulfide to form crystal platelets of the phosphor which deposit on the substrate.

It is preferred in accordance with this invention to form the phosphor layer incrementally by depositing thin layers of halide and converting them to the sulfide in sequence. The final layer is smoother and has a finer crystal grain as a result. It is contemplated, for example, that a phosphor layer one micrometer thick would be deposited in three or more approximately equal increments. The temperatures utilized in the subject method are highly advantageous as it permits the formation of activated alkaline earth metal sulfide phosphors on glass substrates which cannot tolerate temperatures substantially in excess of about 600° C. It is to be understood, however, that incremental deposition can only be carried out with the halide and with not the precursors, due to reactions of the underlying phosphor with the hydrogen halide.

A fragment of a typical AC electroluminescent cell incorporating a phosphor layer prepared in accordance with this invention is shown in partial schematic, partial sectional view in FIG. 1. The cell illustrated in FIG. 1 comprises a substrate 10 of a conventional glass such as borosilicate glass, having thereover a first patterned layer 12 of a transparent conductor such as tin oxide which is typically about 400 nanometers thick. Overlying the first transparent conductor 12 is a layer of an insulating material 14, such as aluminum oxide, typically about 300 nm thick. Since the method of this invention permits the deposition of a phosphor layer at low temperatures, a layer of an activated alkaline earth metal sulfide 16 such as electroluminescent europium-activated strontium sulfide (EL SrS:Eu), is deposited over the insulating layer 14, typically to a thickness of about 500 nm. A second insulating layer 18 and a second patterned conducting layer 20 overlie the phosphor layer 16. The second insulating layer 18 is also suitably aluminum oxide which is advantageously deposited by sputtering. The second conducting layer 20 is preferably a metal such as aluminum.

The first and second conducting layers 12 and 20 are typically comprised of parallel strips about 2.5 mm wide separated by 2.5 mm spaces and oriented orthogonally one layer with respect to the other. The conducting layers 12 and 20 are connected to opposite sides of a source 22 of 5-kilocycle-sine-wave AC power through leads 24.

The method of this invention is advantageous in that the EL layer 16 is formed at low temperatures yet possesses excellent crystal structure. The method of this invention provides excellent control of the amount of activator in the phosphor film and is essentially free of the problem of activator segregation which has been encountered with previous deposition methods such as e-beam evaporation. In addition, activated alkaline earth metal sulfide phosphor layers produced by the present method demonstrate exceptional brightness, up to about 500 foot-lamberts. This is greater than 30 times the efficiency of similar phosphors produced by the method disclosed in the aforementioned Kane et al. copending application. It is believed that the increase in brightness of the phosphors produced by the subject method is the result of their significantly enhanced crystalline perfection.

The following Examples further illustrate this invention, it being understood that the invention is in no way intended to be limited to the details described therein. In the Examples, all parts and percentages are on a mole basis and all temperatures are in degrees Celsius, unless otherwise stated.

EXAMPLE I

Twenty grams of strontium iodide containing 1 percent of europium were dissolved in 500 cc of anhydrous methanol. The solution was filtered and passed through an ultrasonic nebulizer to form an aerosol which was injected into nitrogen at a flow rate of 500 sccm. The aerosol was impinged on a glass substrate which was heated to about 70°. The substrate was borosilicate glass, 43 mils thick, having thereon a patterned layer of tin oxide 300 nm thick over which was a layer of sputtered aluminum oxide dielectric 300 nm thick. Deposition was continued for 15 minutes to deposit a uniform layer of strontium iodide crystals.

The substrate was heated in a nitrogen atmosphere to 550° thus melting the iodide layer to form a liquid film on the substrate. Hydrogen sulfide was introduced into the heating vessel at a flow of 100 sccm for 15 minutes. There was thus formed a layer of crystalline strontium sulfide:europium crystal platelets. The layer was approximately 0.5 micrometer thick although the rough surface prevented exact thickness measurement. A 250 nm thick dielectric layer of aluminum oxide was deposited over the phosphor by chemical vapor deposition. A 100 nm thick layer of aluminum was deposited over the aluminum oxide layer by evaporation and patterned. AC voltage was connected to single strips of each patterned conductive layer.

Figure 2:
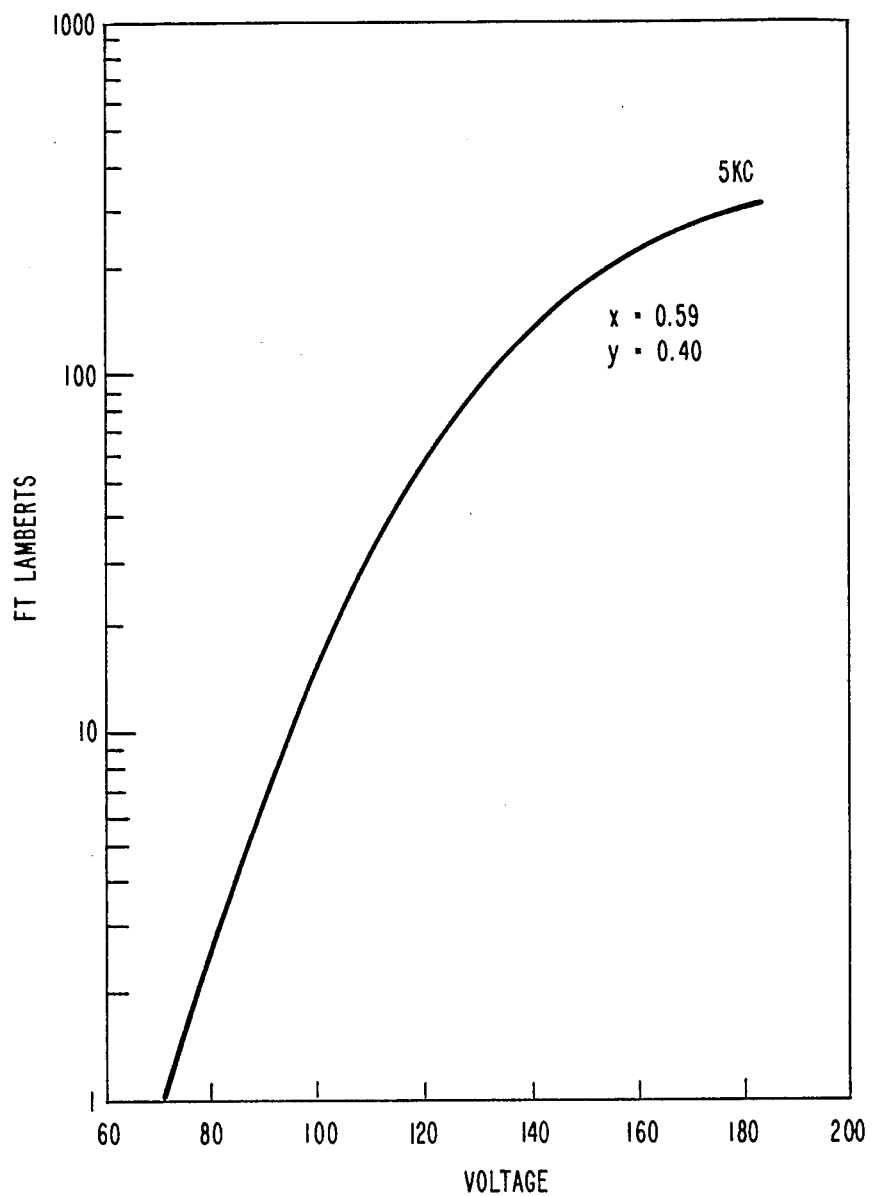
FIG. 2 is an EL brightness vs. voltage curve for a device having the structure shown in FIG. 1 and prepared according to the method of Example 1.

The device was driven with a 5 Kc sine wave with a maximum applied voltage of 260 volts. A brightness voltage curve was obtained and is illustrated in FIG. 2. The device was orange-red emitting. The x and y values refer to the chromaticity of the phosphor.

EXAMPLE 2

Figure 3:
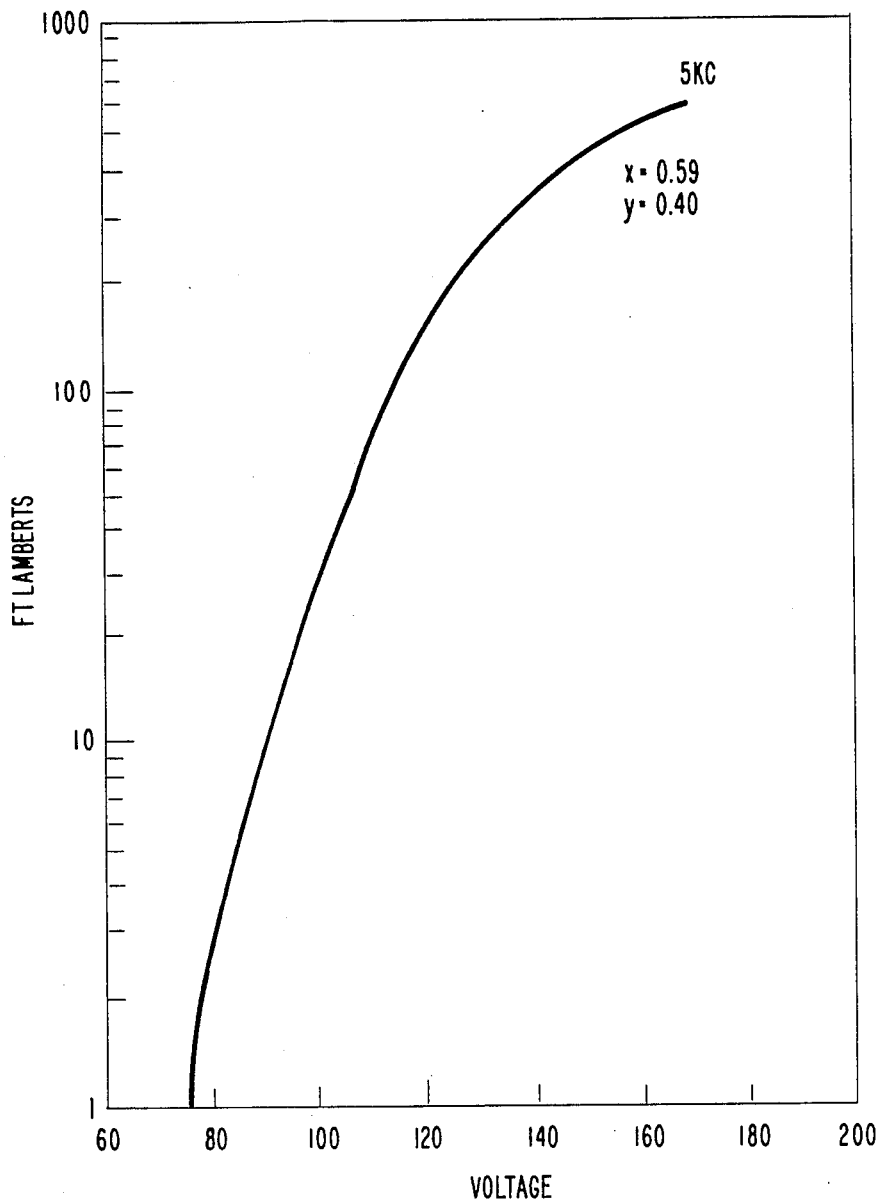
FIG. 3 is an EL brightness vs. voltage curve for a device prepared according to Example 2.

Example 1 was repeated with the exception that the SrS:Eu layer was formed in three increments, each approximately 300 nm thick. Each incremental addition was formed by the method of Example 1. The final thickness of the phosphor layer was 1 micrometer. The layer was much smoother than that of Example 1 and had a finer, more uniform crystal structure. The device was completed as in Example 1. A voltage-brightness curve was obtained and is shown in FIG. 3. The significant improvement in comparison with the device of Example 1 is clearly evident.

EXAMPLE 3

A sintered pellet of strontium carbonate containing 1 percent of copper as an evaporation source was placed in a conventional electron beam evaporator and irradiated with a 10 KeV electron beam. Deposition was continued for 90 minutes producing a layer of strontium oxide one micrometer thick on a substrate as in Example 1.

Figure 4:
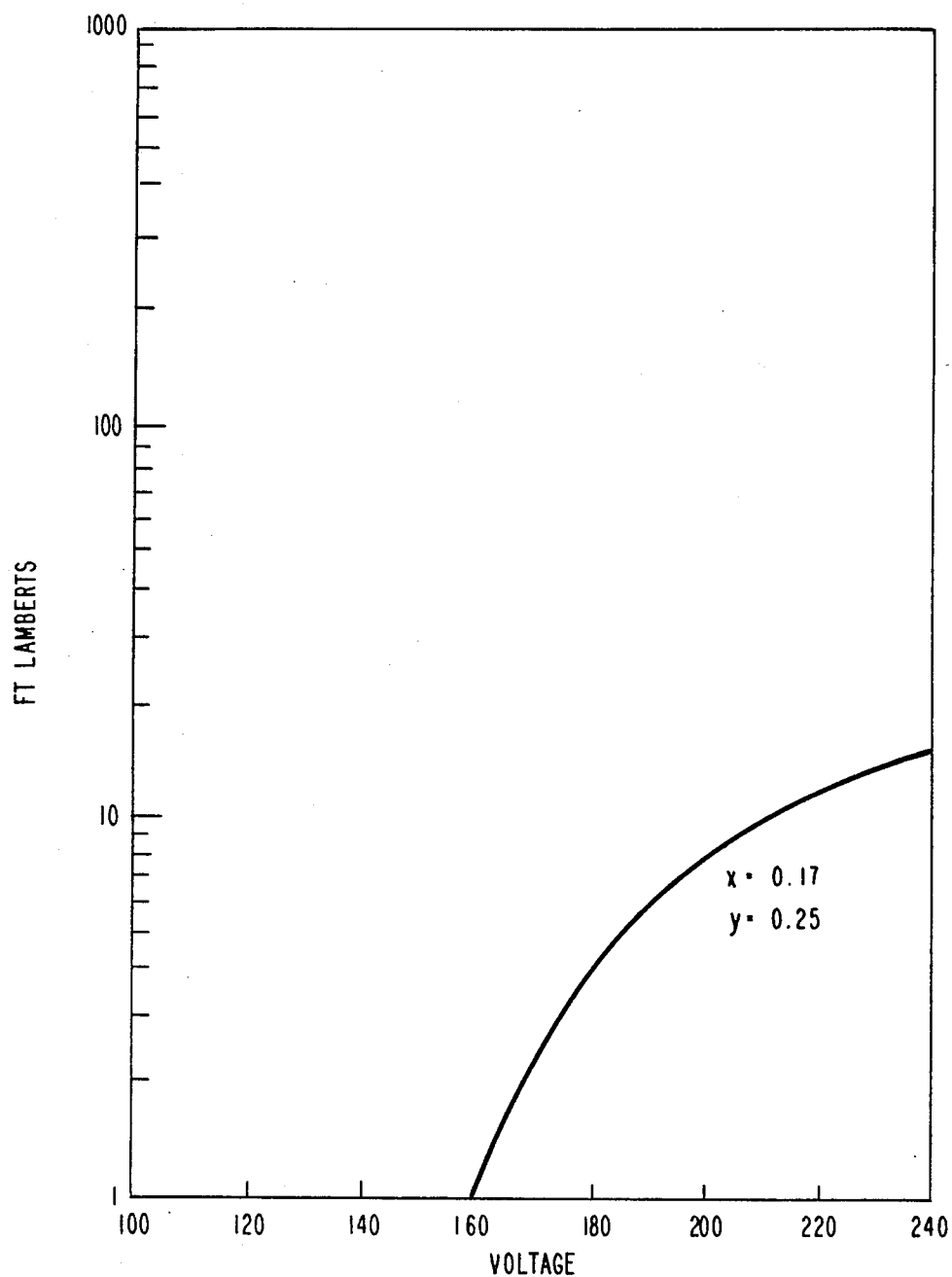
FIG. 4 is an EL brightness vs. voltage curve for a device prepared according to Example 3.

The substrate was placed in a suitable vessel, heated to 550° and exposed to gaseous hydrogen iodide for 30 seconds thereby converting the strontium oxide to molten strontium iodide. The vessel was swept of hydrogen iodide with nitrogen and hydrogen sulfide was introduced at a flow of 100 sccm. Treatment with hydrogen sulfide for 15 minutes produced a layer of strontium sulfide/copper 1.0 micrometer thick. The device was completed as in Example 1 and a voltage-brightness curve was obtained and is shown in FIG. 4. Brightness up to about 50 foot-lamberts was produced. The emission of the device was a desaturated blue/green.

We claim:

1. A method of depositing a luminescent thin film on a substrate having a softening point of less than 650° C. comprising:
    (a) depositing on the substrate a layer of an alkaline earth metal halide and a suitable activator for said film;
    (b) heating said layer to a temperature less than the temperature of the softening point of the substrate but sufficient to melt the halide; and
    (c) contacting the molten halide with gaseous hydrogen sulfide for a time sufficient to convert the halide to the corresponding activated alkaline earth metal sulfide.

2. A method in accordance with claim 1, wherein said layer is deposited by sputtering.

3. A method in accordance with claim 1, wherein said layer is deposited by electron beam evaporation.

4. A method in accordance with claim 1, wherein said layer is deposited by forming an aerosol from a solution or dispersion of the halide and the activator in a suitable solvent and contacting the surface of the substrate with the aerosol in a suitable inert carrier gas.

5. A method in accordance with claim 1, wherein the halide is a strontium halide.

6. A method in accordance with claim 1, wherein the halide is strontium iodide.

7. A method in accordance with claim 1, wherein the activator is selected from the group consisting of europium, cerium, manganese, terbium, praseodymium, antimony, samarium, thulium, tin, copper, lead, silver, gold and arsenic.

8. A method in accordance with claim 8, wherein the activator additionally comprises a co-activator selected from the group consisting of sodium, potassium, lithium, rubidium, phosphorus, bromine, fluorine, chlorine and iodine.

9. A method in accordance with claim 1, wherein the molten halide layer is formed by depositing a precursor for the alkaline earth metal halide onto the substrate, heating the precursor to a temperature sufficient to melt the halide and treating the precursor with gaseous hydrogen halide for a time sufficient to convert it to the molten halide in-situ.

10. A method in accordance with claim 9, wherein the precursor is an alkaline earth metal oxide.

11. A method in accordance with claim 1, wherein the halide layer is heated to from about 525° to about 575° C.

12. A method in accordance with claim 1, wherein steps (a), (b) and (c) are repeated until a film of a predetermined thickness is deposited.

13. In a method of forming an electroluminescent device including sequentially depositing on an insulating substrate; a first patterned layer of conductive material; a first layer of insulating material; a layer of electroluminescent material; a second layer of insulating material; and a second patterned layer of conductive material, the improvement wherein the layer of electroluminescent material is an activated alkaline earth metal sulfide and said layer is formed by the method of claim 1.

14. A method in accordance with claim 13, wherein the substrate is glass.

15. A method in accordance with claim 13, wherein the halide is a strontium halide.

16. A method in accordance with claim 15, wherein the halide is strontium iodide.

17. A method in accordance with claim 13, wherein the halide layer is heated to from about 525° to about 575° C.

18. A method in accordance with claim 13, wherein steps (a), (b) and (c) are repeated until a film of a predetermined thickness is deposited.

19. A method in accordance with claim 13, wherein the molten halide layer is formed by depositing a precursor for the alkaline earth metal halide onto the substrate, heating the precursor to a temperature sufficient to melt the halide and treating the precursor with gaseous hydrogen halide for a time sufficient to convert it to the molten halide in-situ.

20. A method in accordance with claim 19, wherein the precursor is an alkaline earth metal oxide or carbonate.

* * * * *